Aug. 14, 1923.

W. O. AMSLER 1,464,554

CONVEYER AND LEER CHARGING MECHANISM

Filed Feb. 2, 1921      7 Sheets-Sheet 1

WITNESSES

INVENTOR

Aug. 14, 1923.

W. O. AMSLER 1,464,554

CONVEYER AND LEER CHARGING MECHANISM

Filed Feb. 2, 1921

WITNESSES

INVENTOR

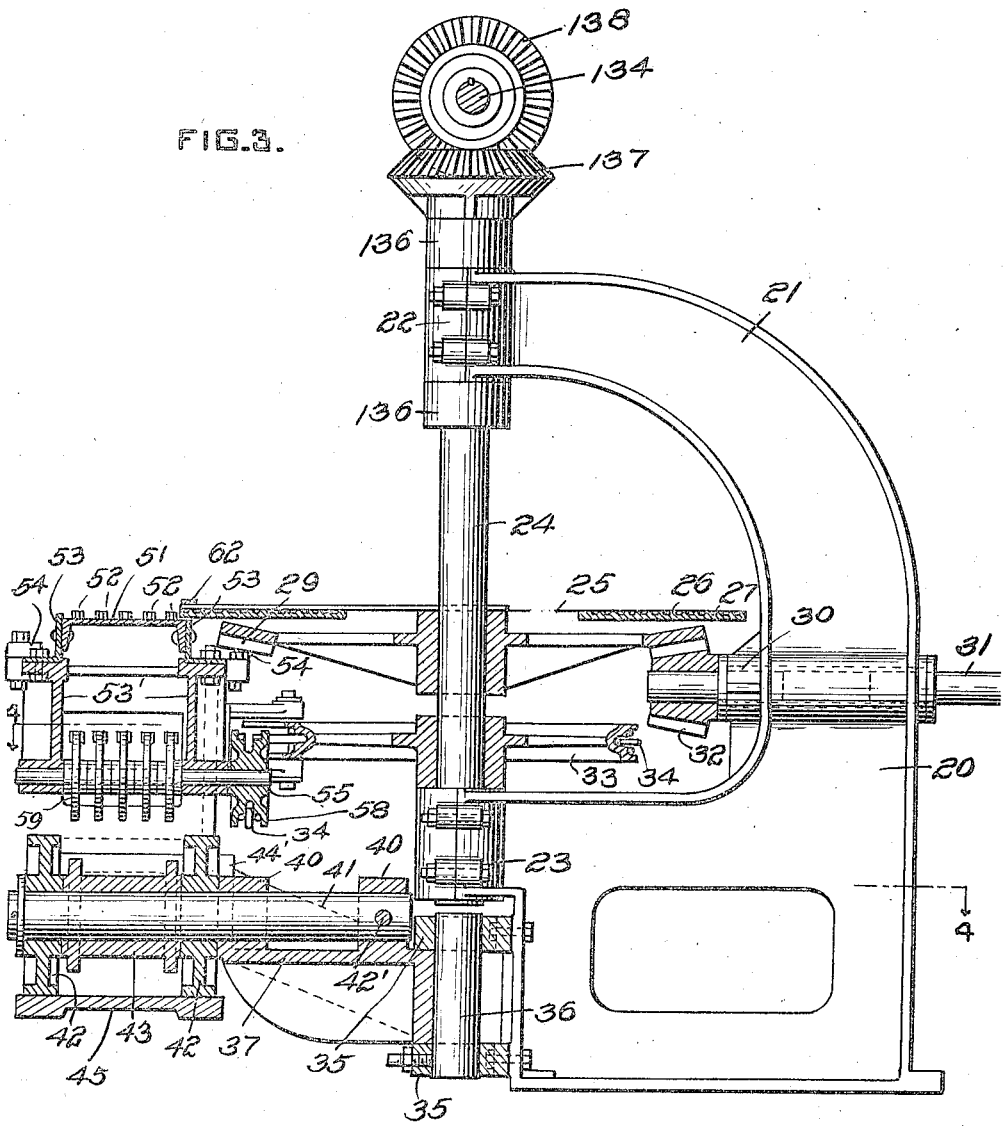

Aug. 14, 1923.
W. O. AMSLER
1,464,554
CONVEYER AND LEER CHARGING MECHANISM.
Filed Feb. 2, 1921 7 Sheets-Sheet 4
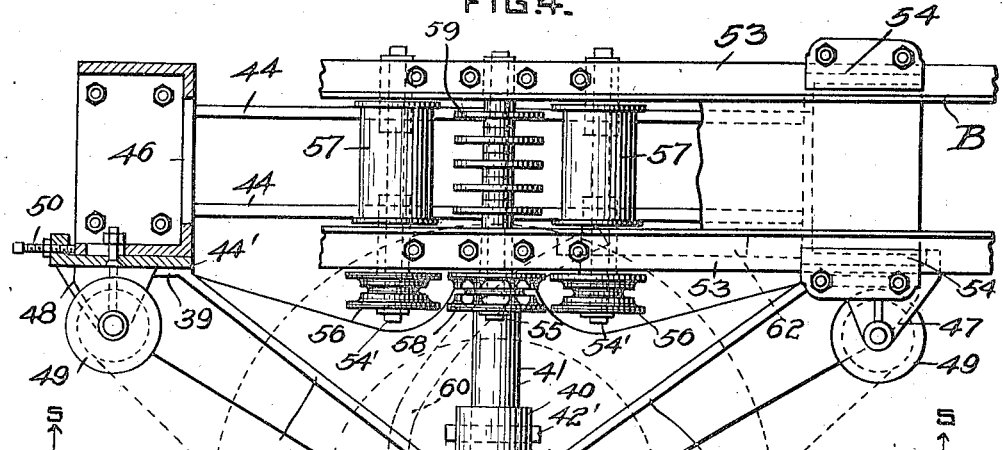
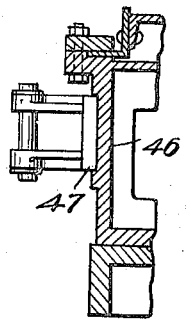
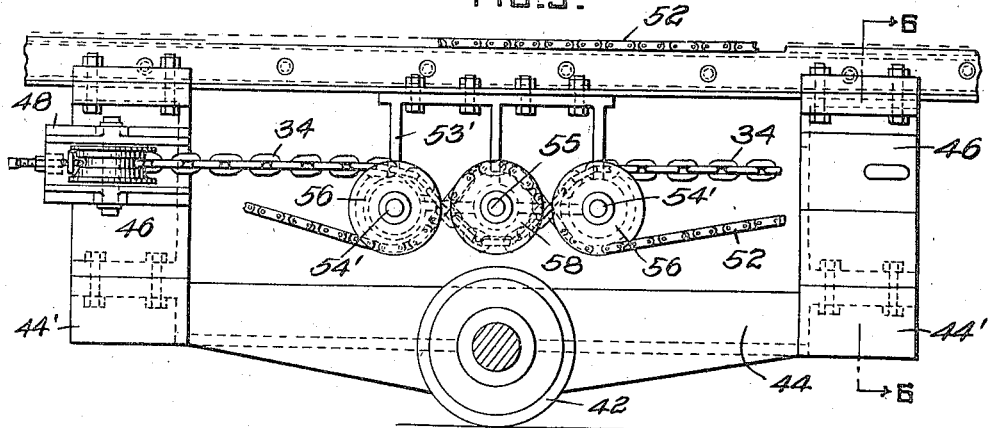

Aug. 14, 1923. 1,464,554
W. O. AMSLER
CONVEYER AND LEER CHARGING MECHANISM
Filed Feb. 2, 1921 7 Sheets-Sheet 5
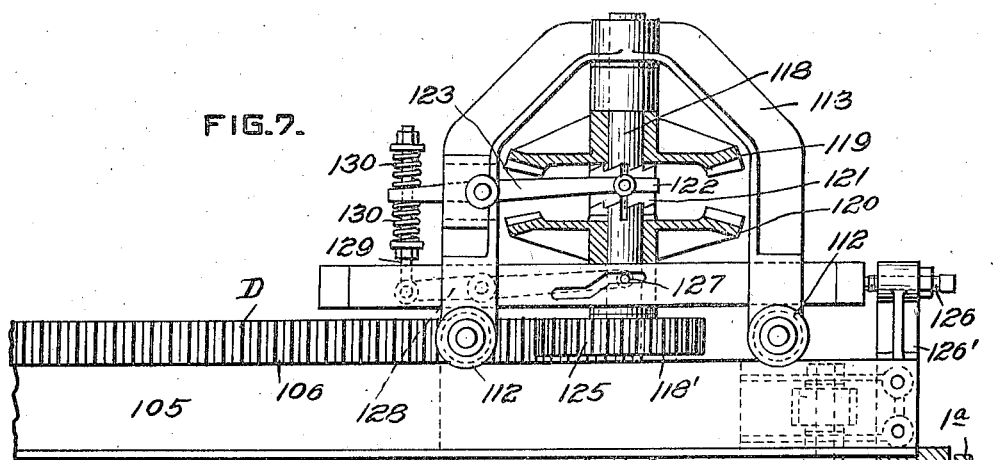
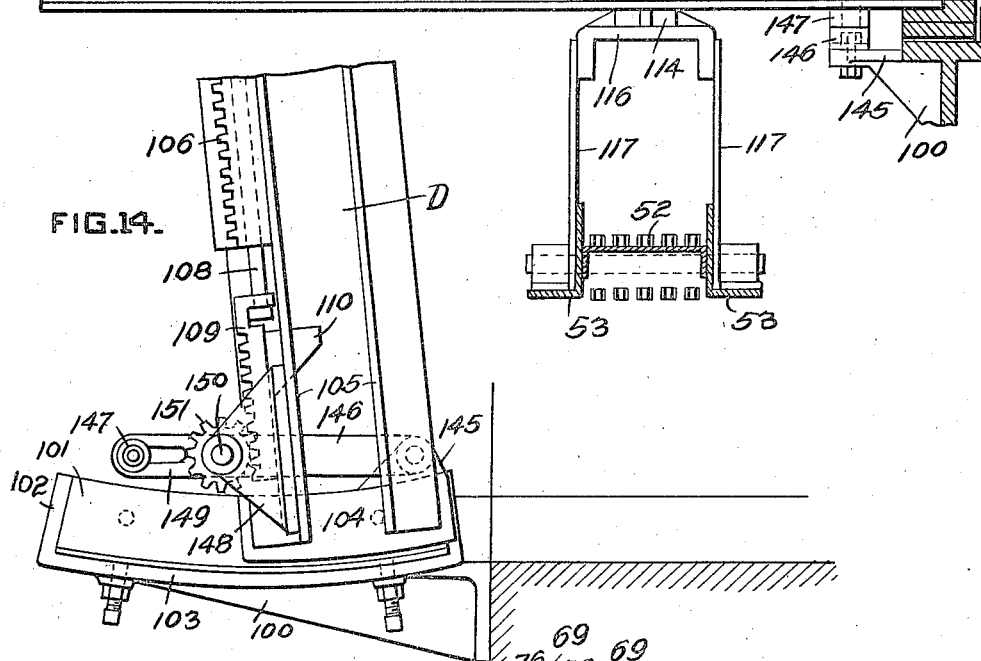
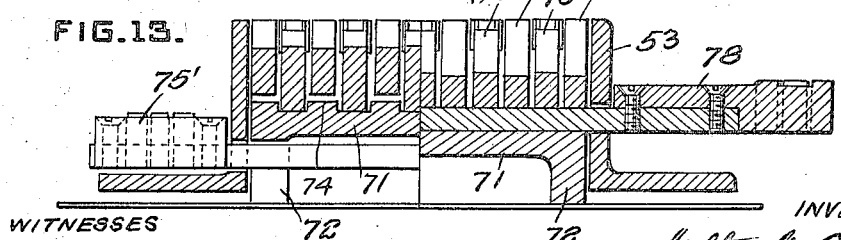

Aug. 14, 1923.
W. O. AMSLER
1,464,554
CONVEYER AND LEER CHARGING MECHANISM
Filed Feb. 2, 1921
7 Sheets-Sheet 6
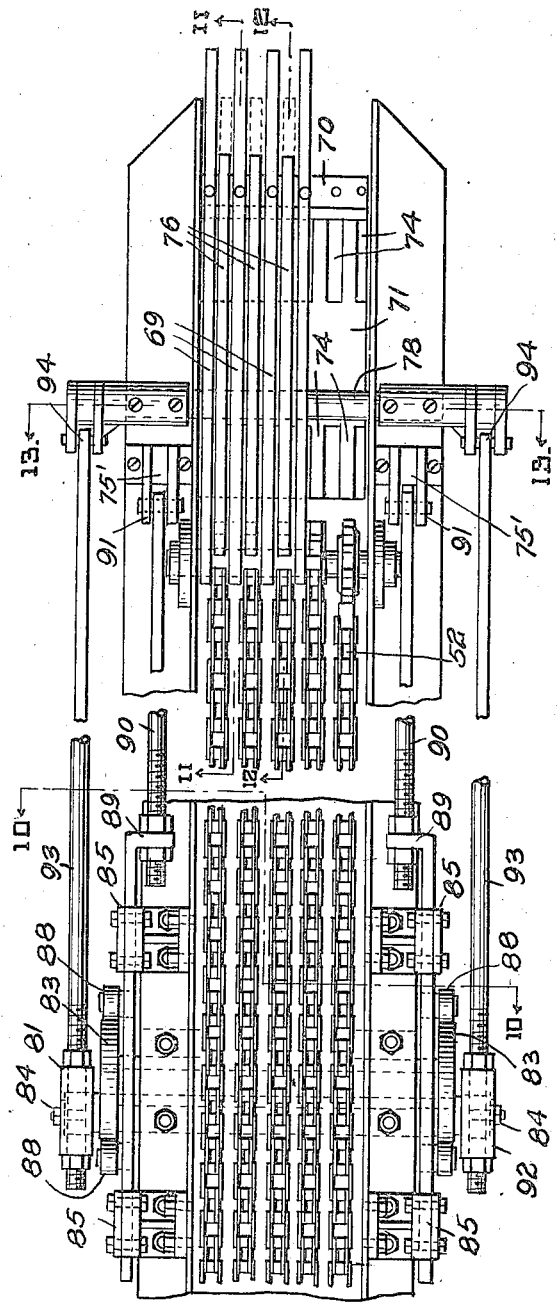
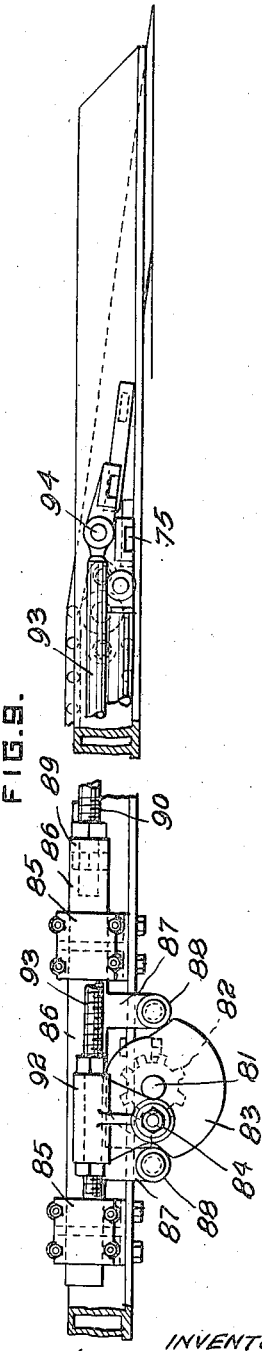

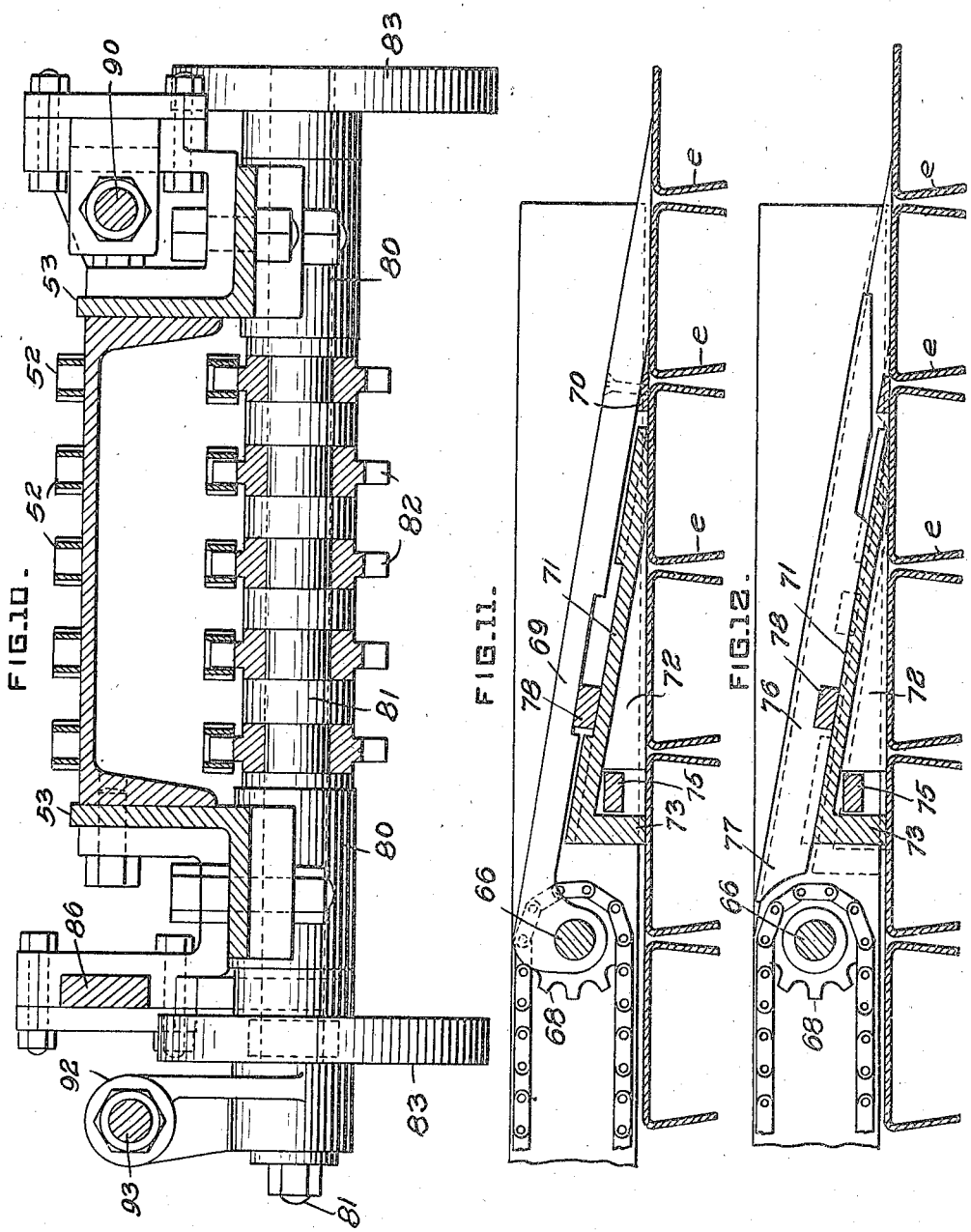

Patented Aug. 14, 1923.

1,464,554

UNITED STATES PATENT OFFICE.

WALTER O. AMSLER, OF PITTSBURGH, PENNSYLVANIA.

CONVEYER AND LEER-CHARGING MECHANISM.

Application filed February 2, 1921. Serial No. 441,912.

*To all whom it may concern:*

Be it known that I, WALTER O. AMSLER, a citizen of the United States, residing at Pittsburgh, in the county of Allegheny and State of Pennsylvania, have invented certain new and useful Improvements in Conveyer and Leer-Charging Mechanism, of which the following is a specification.

My invention relates to a new and improved conveyer and leer charging mechanism for receiving, conveying and delivering glassware or glass articles.

In transferring glass articles from a glass molding machine to a leer conveyer, it is of the utmost importance that the articles should be transferred with the least possible contact with other objects, and in such a manner that the articles themselves will not be in contact, either during the transfer or while positioned on the leer conveyer, and the present invention is particularly directed to providing an efficient mechanism designed to acomplish these ends.

An object of the present invention is to provide a leer feeder of the endless conveyer type, which will deposit a row of articles across the leer, and which conveyer will then move backward a sufficient distance to deposit the next row in proper spaced relation, all pushing of the articles being eliminated.

Further objects of the invention are, to provide automatic means for effecting this movement of the conveyer; to provide an improved device for transferring the glassware from the feeding conveyer to the leer conveyer without the necessity of pushing or shoving them; to provide improved means for driving the feeding conveyer in such manner that the speed of the conveyer will not be changed when the conveyer is moved backward; and to provide a feeder of this kind which shall be entirely automatic in its operation, and will preferably be driven from a single source of power.

These and other objects will be apparent from the accompanying description of the machine.

According to my invention, a rotary table is spaced at some distance from the leer. This table is adapted to receive the glassware after it has been molded and to transfer it to a chain conveyer, one end of which oscillates about the table, the arrangement being such that the articles are delivered tangentially thereto. The opposite end of the chain conveyer is preferably suspended from a trolley which moves along a track or bridge extending across the front of the leer and adapted to oscillate through a limited arc. Mechanism is provided for holding the track in a given position until the trolley reaches the end of the track, whereupon, that end is oscillated rearwardly relative to the leer, and the opposite end of the track is moved a corresponding distance forward. The direction of travel of the trolley is automatically reversed and the conveyer is moved across the leer in the opposite direction. An inclined delivery means is provided for receiving the articles from the conveyer and depositing them on the leer conveyer. By this arrangement of a continuous conveyer and a trolley on an oscillatory track, the articles may be deposited across the leer in a row, after which the conveyer and delivery means move backward a few inches and the next row is deposited, each successive row being properly spaced from the preceding one. Owing to the continuous movement of the leer conveyer, this spacing of the rows is continuously maintained.

While the foregoing describes my invention broadly, the invention may be more fully understood by reference to the accompanying drawing, in which:

Fig. 3 is a vertical section on a larger scale on the line 3—3 of Fig. 1.

Fig. 4 is a horizontal section on the line 4—4 of Fig. 3, certain portions of the table above the line where the section is taken being indicated by dotted lines;

Fig. 5 is a vertical section on the staggered line 5—5 of Fig. 4;

Fig. 6 is a portion of a vertical section on the line 6—6 of Fig. 5;

Fig. 7 is a vertical section showing in detail the automatic driving and reversing mechanism for the trolley;

Fig. 8 is a plan view of the delivery end of the conveyer and delivery table;

Fig. 9 is a side elevation of the portion of the apparatus shown in Fig. 8;

Fig. 10 is a section on the staggered line 10—10 of Fig. 8;

Fig. 11 is a longitudinal section through the delivery mechanism on line 11—11 of Fig. 8;

Fig. 12 is a similar section on line 12—12 of Fig. 8;

Fig. 13 is a cross section on the staggered line 13—13 of Fig. 8; and

Fig. 14 is an enlarged detail view of the mechanism for oscillating and for holding the trolley track against oscillation.

Figure 1:
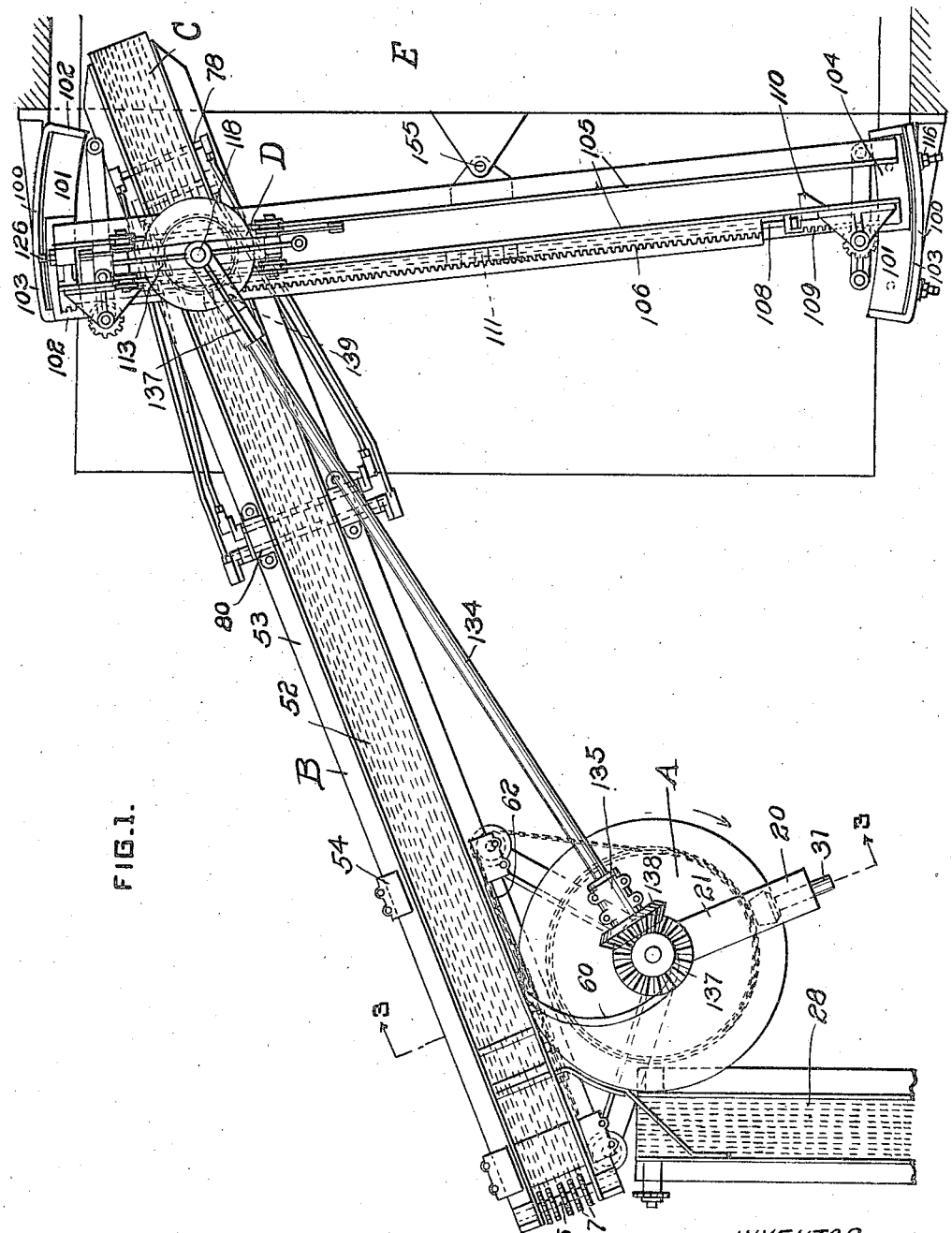
Fig. 1 is a plan view of an apparatus embodying my invention.
Figure 2:
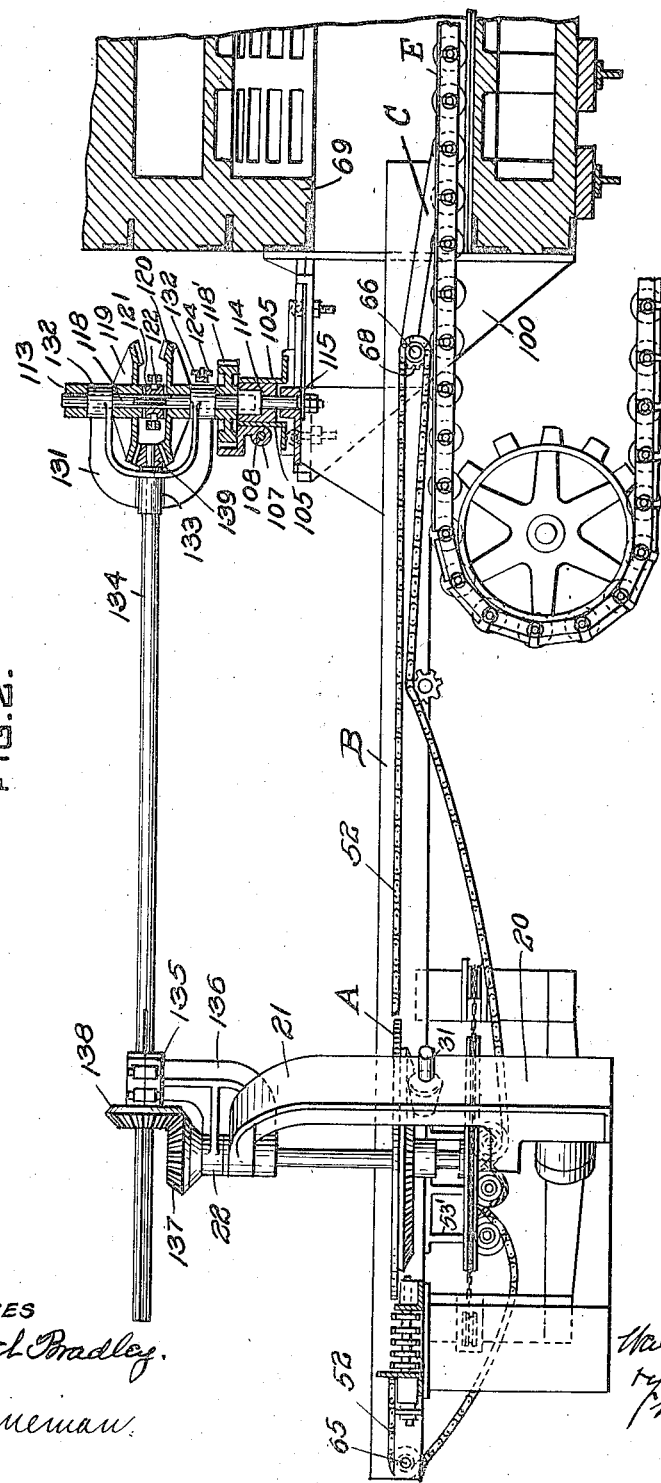
Fig. 2 is a side view partly in section and partly in elevation of the apparatus shown in Fig. 1.

Referring particularly to Figs. 1 and 2 of the drawings, which show an entire assembly of my machine, A indicates generally the rotary table with its accompanying driving mechanism and supports, this table being for the purpose of receiving articles to be carried to the leer. B indicates the conveyer and C is the delivery mechanism at the end of the conveyer. The trolley and its track are indicated generally at D. The leer, which is of ordinary construction, is designated by the letter E.

The rotary table mechanism indicated by the letter A is best shown in Figs. 3, 4 and 5. A frame in the form of a single casting is indicated by 20, and it is formed with an upwardly extending overhanging arm 21 provided with a bearing 22. A bearing is formed near the bottom of the casting at 23. Journalled in the bearings 22 and 23 is a vertical shaft 24 to which is keyed a round flat table 25. On the upper surface of the table 25 near its periphery is an annular plate 26 having a series of circular serrations 27. This annular plate is adapted to receive glass articles direct from the molding machine (not shown) or from a suitable independent conveyer 28, shown in Fig. 1. The serrations tend to prevent hot articles from being cracked by providing a minimum supporting area with which they contact.

The under side of the table 25 is provided with an annular rack 29. A journal 30 is provided in the support 20 for a power driven shaft 31 having a pinion 32 thereon for engaging the rack 29 to rotate the table. Also keyed to the shaft 24 is a wheel 33 for transmitting motion to a chain 34 which engages its periphery for the purpose hereinafter more fully described.

At the bottom of the support or casting 20 are a pair of spaced apart lugs 35 in which is carried a shaft 36. Journalled on the shaft 36 is a substantially triangular shaped plate 37 adapted to oscillate about the support 20. This plate shown in plan in Fig. 4 is provided with radial strengthening ribs 38 which terminate at upright portions 39 having smooth outer surfaces. Located centrally between the ribs 38 are anchors 40 for an axle 41 which is held from rotation by a pin 42', the axle 41 projecting beyond the edge of the plate 37.

On the axle 41 are mounted wheels 42 which are spaced from each other by a sleeve 43. This sleeve 43 is preferably formed integrally with a truss member 44 which forms the bed of a wheeled truck for supporting the conveyer B. The wheels 42 roll on segmental track 45. At each end of the truss 44 at 44' are smooth surfaces adapted to slidably engage the smooth vertical portions 39 on the plate 37. This provides means whereby some of the strain and thrust may be taken from axle 41 and yet permit the wheeled truck for the conveyer to oscillate in a vertical plane, should the conveyer ever be out of proper horizontal alinement.

At each end of the truss member 44 are vertical supports 46. On the table side of the supports are brackets 47 and 48 for carrying pulleys 49 journalled therein, bracket 48 being slidably secured to the support and having a screw bolt 50 carried thereby which serves to move it. The chain 34 passes over the pulleys and it can be tensioned by adjusting the screw 50.

Plate 51 shown in cross section in Fig. 3 in proximity to the periphery of the table 25 forms a support for the feeding or delivery conveyer, which conveyer comprises a plurality of chains 52. Plate 51 is supported by angle irons 53 at each side thereof, which extend throughout the length of the conveyer and delivery table. These angle irons are slidably retained in position by blocks 54 secured to the tops of the vertical supports 46 and at each side thereof.

Depending from angle irons 53 are brackets 53' having a series of three bearings thereon in which are journalled transverse shafts 54' and 55, 55 being the central shaft and 54' the end shafts. On the ends of the shafts 54' toward the table are idler pulleys 56, and idler rollers 57 are mounted on these shafts between the angle irons 53. Keyed to the projecting end of shaft 55 is a toothed pulley 58, and between the angle irons and keyed to this shaft are a series of spaced apart sprocket wheels 59. The chain 34 is reeved over the idlers 56 and under sprocket wheel 58, and the return flights of the conveyer chain 52 are reeved under the idler rollers 57 and over the sprockets 59. When the table is rotated in the direction of the arrow in Fig. 1, the conveyer chains 52 will be driven in a direction which will move the articles placed thereon toward the leer.

It will be seen that the conveyer chains 52 will, by this arrangement, be advanced at a regular speed, irrespective of the shuttle or sliding longitudinal movement of the conveyer frame relatively to the rotary table. It will also be seen that the conveyer will be allowed to oscillate through a limited arc and yet be maintained in a position tangential to the rotary table 25. Journalled about the vertical shaft 24 is a convolute guide 60 having its outer end secured to a strip 62 shown in dotted lines in Fig. 4, the strip 62 being secured to one of the vertical supports. This convolute guide strip 60 serves to guide glassware from the rotary plate 27 tangentially to the conveyer 52.

The chain conveyer 52 (which projects into the leer E) extends from a rear shaft 65 to a front shaft 66 (see Fig. 2) journalled in angle irons 53. The rear shaft 65 is provided with a series of spaced apart sprocket wheels 67 for the chains 52. The front shaft 66 is also provided with a series of sprocket wheels 68 which are held in spaced relation by means of inclined tapering bars 69 which are journalled on shaft 66 between the sprockets, as shown in Fig. 11, and which form part of the delivery means C. The outer ends of these bars rest on the conveyer plates e of the endless conveyer which passes through the leer. The extremities of the bars 69 may be held in spaced relation by a cross strip 70 secured thereto.

Positioned beneath the bars 69 is an inclined plate 71 preferably having integral depending sides 72 and a depending rear portion 73. The front of the inclined or wedge plate 71 rests on the plates e of the endless conveyer, while the depending side and rear flanges 72 and 73 respectively also rest on the said plates (see Figs. 11, 12 and 13).

The plate 71 is provided with two separate series of raised portions 74 for the accommodation of the under sides of the bars 69, as indicated in Fig. 8, which figure shows several of the bars 69 removed. 75 is a cross bar passing through notches in the side flanges 72, the ends 75' of this cross bar projecting through slots in the sides of the conveyer frame, as shown in Figs. 8 and 9. Slidably mounted on the inclined plate 71 between stationary bars 69 and in the channels between the raised parts 74, are slidably tapered bars 76 having rounded upper ends 77 which conform substantially to the curvature of the chain conveyer, as shown in Fig. 12. A cross bar 78 in notches in the under sides of the bars 76 is provided for sliding the bars, this cross bar projecting through slots in the angle iron 53.

Supported by journals 80 on the under sides of the angle iron 53 and a short distance to the rear of the front shaft 66 is a shaft 81 having chain engaging sprockets 82 adapted to be driven by the chains 52 to transmit motion to the shaft 81. On each end of the shaft 81 is a cam 83 substantially of the shape shown in Fig. 9, each of these cams having two portions with a sloping surface extending through an arc of about 15°, the remaining 330° being divided into two rounded surfaces, the radius of one of which is, in practice, preferably about an inch greater than the radius of the other. Eccentrically mounted on each cam 83 is a pin 84.

Slidably supported in guides 85 at each side of the conveyer (see Figs. 8 and 9) is a bar 86 having depending portions 87 on which are rollers 88 adapted to engage the periphery of the cams. Having an adjustable threaded connection with the end 89 of each bar 86 is a rod 90 which has its opposite end connected to a bifurcated member 91 on each end 75' of the cross bar 75. It will be seen that upon rotation of the cams 83, the inclined plate 71 will be reciprocated along the conveyer plates e.

Connecting members 92 on eccentric pins 84 are adjustably connected with rods 93, which latter are pivotally joined at 94 to the projecting ends of cross bar 78. By this mechanism, the slide bars 76 may be reciprocated.

In operation, the cross bar 70 rests on the receiving or leer conveyer e and supports the delivery table, as described, and indicated broadly by the letter C. For the purpose of explanation, it will be assumed that the plate 71 and bars 76 are both in the rearmost or retracted position with relation to the leer. Upon rotation of the cams 83, the wedge plate 71 will move forward, raising the slide bars 76 above the stationary bars 69. The slide bars 76 will then be moved forward by reciprocation of cross bar 78 through rods 93, and, by reason of the shape of the cams 83, the inclined or wedge plate 71 will remain stationary during the forward movement of the slide bars 76. This upward and forward movement of the slide bars 76 will move the articles down the inclined delivery means and finally deposit them on the leer conveyer. When the bars 76 have been moved to the forward limit of their motion, the inclined plate 71 will move backward, lowering the slide bars 76, after which they will be moved backward again to the retracted position. During this backward movement, the glassware will remain at rest on the stationary bars 69. Thus, a progressive step by step movement is given them, and they are deposited on the leer conveyer without pushing one another or without being pushed.

The delivery end of the conveyer is suspended or otherwise supported on a movable trolley track indicated at D. Supported at each side of the front of the leer are brackets 100 having curved smooth top surfaces 101 with flanged ends 102 by a curved guide 103 at the back thereof (see Figs. 1, 2 and 14). Slidably carried on the top surface 101 are plates 104. Secured to these plates 104 are a pair of spaced apart angle irons 105 which have their base portions turned away from each other. Secured to one of these angle bars is a rack 106 which extends throughout the greater length of the angle irons. Slidably supported in guides 107 is a rod 108 having its ends provided with a toothed rack 109 from which project lugs 110. A turn-buckle 111 is provided between the ends of the rod.

Movably supported on the angle irons 105 by means of wheels 112, the angle irons serving as a track for the wheels, is a trolley frame 113. This frame has a depending portion 114 extending between the two angle bars 105, and pivoted to this portion by a bolt 115 is a spreader 116 (see Fig. 7), having hangers 117 which connect with the angle irons 53 of the conveyer frame for suspending the conveyer. Centrally supported in the trolley frame is a rotatable shaft 118 having a spur gear 118' keyed thereto which engages rack 106. Loosely mounted on the central vertical shaft 118 are upper and lower bevel gear wheels 119 and 120 respectively. Between the two opposed gear faces of these two gears 119 and 120 is a clutch member 121 operating on a sliding key-way on the vertical shaft 118. A feather 122 is provided for shifting the clutch member vertically, and this feather is carried by a pivoted lever 123.

Slidably guided in the trolley frame is a bar 124 (see Fig. 7) which has an inclined slot 125 therein. This bar projects beyond each end of the trolley frame and is adapted to be operated or moved by engagement with bolts 126, the latter being carried on brackets 126' extending upwardly from angle irons 105. A pin 127 on the end of a pivoted lever 128 on the trolley frame operates in the inclined slot 125. The opposite end of this lever transmits motion to a vertical link 129. By means of compression springs 130 on link 129, the motion is transmitted to the pivoted lever 123 for actuating the feather 122.

Journalled about the vertical shaft 118 in the trolley frame 113 is a C-shaped or bifurcated member 131 having upper and lower vertical journals 132 and a horizontal journal 133. Rotatable in journal 133 is the end of a shaft 134 having its other end slidably journalled in a bearing 135 which is supported by a yoke 136 disposed near the upper end of shaft 24. Keyed to the vertical shaft 24 of the rotary table is a bevel gear wheel 137 which meshes with a gear wheel 138 slidably keyed to shaft 134. On the trolley end of shaft 134 is a bevel wheel 139 which meshes with the opposed upper and lower gear wheels 119 and 120 respectively, and drives them in opposite directions.

In operation, rotation of the table drives the shaft 24, horizontal shaft 134, and the gear wheels 119 and 120 are thereby rotated. By reason of the clutch member 121, rotation of one of these gears is imparted to the vertical shaft 118, causing the pinion 118' to rotate and engage the teeth on the rack 106, thereby effecting a transverse movement of the trolley D. This movement of the trolley also moves the leer end of the feed conveyer B back and forth, across the leer. When the trolley reaches one end of the track, the bar 124 engages one of the bolts or stops 126 and moves it longitudinally of the trolley. The pin 127 sliding in the inclined slot 125 imparts motion to the lever 128 to shift the clutch 121 to reverse the direction of rotation of shaft 118 and accordingly reverse the movement of the trolley.

As the carriage moves across the leer, the glassware is deposited on the plates e in a transverse row. If no means were provided for either advancing this row of glassware or for moving the delivery end of the conveyer rearwardly, it will be seen that the glass articles would crowd against each other. For insuring proper spacing of the rows, I provide means for oscillating the trolley track so that it is always at an angle with relation to the leer, with one end in advance of the other, the conveyer being moved rearwardly or retracted several inches when the trolley reaches the end of the rack, and then advanced gradually by the trolley traveling along the track which is angular with relation to the path of travel of the leer conveyer e.

For effecting this oscillation of the track, I provide lugs 145 on the brackets 100 at the sides of the leer. To these lugs at each end of the leer are pivoted links 146 having upright bolts 147 thereon. At 149 are slotted links which pivot on bolts 147, the slot and the links providing a sliding adjustment for varying the effective lengths of the links. On the ends of these links 149 are vertical studs 150 having pinions 151 keyed thereto. These studs are also secured to brackets 148 on the truck frame. The pinions 151 engage the racks 109 at the ends of slide rod 108.

When the track is in stationary position and the trolley is traveling therealong, the pivot points of this series of links at each end of the leer are in alinement and the track is thereby held against oscillation. When the trolley nears one end of the track, lugs 110 are engaged and racks 109 are moved in the direction of travel of the carriage. This movement of the racks tends to turn the pinions 151, but, since they are keyed to the studs 150, the motion is transmitted to links 149, swinging them in the direction of movement of the carriage. This movement reacts on upright bolts 147 to swing the free ends of links 146 in a direction opposite to the direction of travel of the carriage. Further movement tends to swing the links 149 with their pinions through a semi-circle, as indicated in dotted lines in Fig. 14, to bring the pivot points once more in alinement. This swinging of the links 149 permits a corresponding movement to the ends of the track, sliding the plates 104 on the surfaces 101. By reason of the slots in the links 149, adjustment of the movement can be obtained to properly provide for spacing of articles of different sizes.

If desired, a central pivot, designated as 155 in Fig. 1, may be provided, and the arrangement of links as hereinbefore described may then be omitted at one end of the track.

In the operation of the entire machine, which will be generally apparent from the foregoing description, glassware from the molding machine (not shown) is fed on to the table, either directly or by a conveyer 28. This glassware is transferred to the tangential conveyer B and carried out to the deliver means C at the end of the conveyer.

The speed of the conveyer will be proportional to the speed of rotation of the table. As the articles are carried along by the conveyer and transferred to the leer, the conveyer will be moved by the trolley D transversely across the front of the leer, the sliding arrangement for the conveyer accommodating for the variations in the radial distance from the table and the triangular journalled supporting plate 37 serves to maintain the tangential relation of the conveyer and the table.

The table end of the conveyer being supported on a truck provided with a single axle, the truck is allowed to oscillate in a vertical plane to accommodate for variations in the horizontal alinement of the trolley track. The trolley being driven from the rotary table, its speed of travel is also proportional to the speed of the table and to the speed of the conveyer. The glassware will thus be deposited across the leer in transverse rows. As each row is completed, the conveyer and trolley are moved rearwardly to retracted position by the oscillation of the track, and space is thus provided for a new row. The movement of the leer conveyer, which is slow but continuous, will serve to remove one row of articles from the path of travel of the delivery means before the delivery means has been advanced again to its foremost or extended position.

It will be seen that after the articles are placed on the delivery conveyer B, nothing contacts with the sides of them, only the bottoms of them being engaged. By proper feeding of the articles from the rotary table, the articles will always be spaced from each other, owing to the speeds of the various devices being proportionate to the speed of the table. Since the sides of the articles do not contact with each other, or with guide members, liability from breakage is reduced.

While I have described a preferred embodiment of my invention, it will be obvious that various changes may be made within the scope and contemplation of the appended claims.

What I claim is:

1. The combination with a receiving conveyer, of a delivery means for delivering articles thereto movable transversely to the receiving conveyer, and means for advancing and retracting the delivery means longitudinally relatively to the receiving conveyer.

2. The combination with a receiving conveyer, of a delivery means for delivering articles thereto and movable transversely to the receiving conveyer, and means for advancing and retracting the delivering means longitudinally of the conveyer upon each transverse movement thereof.

3. The combination with a receiving conveyer, of a delivery means for delivering articles thereto and movable transversely to the receiving conveyer, means for advancing the delivery means longitudinally of the conveyer as it moves transversely across the conveyer, and means for retracting it at the end of each transverse movement.

4. The combination with a continuously moving receiving conveyer, of a delivery means for delivering articles thereto and movable transversely to the receiving conveyer, means for advancing the delivery means as it moves transversely of the receiving conveyer and for retracting it at the end of each transverse movement whereby articles placed on said receiving conveyer by each transverse movement of the delivery means are spaced apart from those deposited on the preceding transverse movement thereof.

5. The combination with a receiving conveyer, of delivery means for depositing articles thereon in transverse rows, and means for advancing and retracting the delivery means longitudinally of the conveyer in such manner that each transverse row may be spaced from the preceding row.

6. The combination with a receiving conveyer, of a delivery conveyer for supplying articles thereto, means for supplying articles to the delivery conveyer, means for moving the delivery conveyer transversely of the receiving conveyer, and means for advancing and retracting the delivery conveyer longitudinally relatively to the receiving conveyer.

7. The combination with a receiving conveyer, of a delivery conveyer for depositing articles thereon, means for supplying articles to the delivery conveyer comprising a rotary table, means for moving the delivery conveyer transversely to the receiving conveyer, means for advancing and retracting the delivery conveyer relatively to the receiving conveyer, and means whereby the delivery conveyer is at all times tangential to the rotary table.

8. The combination with a receiving conveyer, of a delivery conveyer, means for supplying articles to the delivery conveyer, delivery means for transferring each article independently of the others from the delivering conveyer to the receiving conveyer, means for moving the delivery means transversely across the receiving conveyer, and means whereby the delivery means may be advanced and retracted with relation thereto.

9. The combination with a receiving conveyer, of a delivery conveyer, means for supplying articles to the delivery conveyer near one end thereof, delivery means carried at the other end thereof for transferring each article independently of the others from the delivery conveyer to the receiving conveyer, means for moving said delivery means and one end of the conveyer transversely of the receiving conveyer, means for advancing and retracting the delivery means and delivering conveyer relatively to the receiving conveyer, and means whereby the delivering conveyer may be maintained in operative relation to the article supplying means.

10. The combination with a leer having a receiving conveyer therein, of a delivering conveyer for supplying articles thereto and adapted to be advanced and retracted relatively to the leer, means for supporting one end of said delivering conveyer in such manner that the other end may be moved transversely to the receiving conveyer, means adjacent the leer for supporting the transversely movable end comprising a track, a transversely movable trolley thereon by which the transversely movable end of said delivery conveyer is supported, and means whereby said track may be moved relatively to the receiving conveyer.

11. The combination with a leer having a receiving conveyer therein of a delivering conveyer for supplying articles to the receiving conveyer and which may be advanced or retracted relatively to the receiving conveyer, means for supporting one end of said delivering conveyer in such manner that the other end may be moved transversely to the receiving conveyer, means adjacent the leer for supporting the transversely movable end, said means comprising a track, a trolley movable thereon and connected with the transversely movable end of said delivering conveyer, and means whereby said track may be oscillated to cause said delivery conveyer to be advanced or retracted as said trolley travels along the track.

12. The combination with a leer having a receiving conveyer therein, of a delivering conveyer for supplying articles to the receiving conveyer and which may be advanced or retracted relatively to the receiving conveyer, means for supporting one end of said delivering conveyer in such manner that the other end may be moved transversely to the receiving conveyer, means adjacent the leer for supporting the transversely movable end, said means comprising a track, a trolley movable thereon and connected with the transversely movable end of said delivering conveyer, and means whereby the track may be oscillated to retract the delivering conveyer at the end of each transverse movement thereof.

13. The combination with a leer having a receiving conveyer therein, of a delivering conveyer for supplying articles to the receiving conveyer and which may be advanced or retracted relatively to the receiving conveyer, a power driven means for supplying articles to one end of said conveyer, means for supporting such end of the delivering conveyer in such manner that its other end may move transversely of the receiving conveyer, means for driving said delivering conveyer from said supplying means, means for effecting the transverse movement of the transversely movable end of said delivering conveyer comprising a track, a trolley movable on said track and connected with the delivering conveyer, means for driving the trolley along said track, automatic means for reversing the direction of travel, means operated by the trolley for causing said track to oscillate to retract the delivery conveyer when the trolley reverses its direction of travel, and a driving connection between the supplying means and trolley driving means, whereby the speed of the supply means, delivery conveyer and trolley is always proportionate.

14. The combination with a leer having a receiving conveyer therein, of a delivery conveyer for supplying articles to the receiving conveyer which may be advanced or retracted relatively to the receiving conveyer, a power driven means for supplying articles to one end of said conveyer, means for supporting such end of the delivering conveyer in such manner that its other end may move transversely of the receiving conveyer, a delivering means for transferring each article from the delivery conveyer to the receiving conveyer independently of the other articles by a progressive movement, means driven from said delivering conveyer for operating said delivery means, means for driving said delivering conveyer from said supplying means, means for effecting the transverse movement of the transversely movable end of said delivering conveyer comprising a track, a trolley movable on said track and connected with the delivering conveyer, means for driving the trolley along said track, automatic means for reversing the direction of travel, means operated by the trolley for causing said track to oscillate to retract the delivery conveyer when the trolley reverses its direction of travel, and a driving connection between the supplying means and carriage driving means, whereby the speed of the supply means, delivery conveyer, delivery means, and trolley is always proportionate.

15. The combination with a leer having a receiving conveyer, of a delivery means for delivering articles thereto and movable transversely to the receiving conveyer, means for moving the delivery means transversely including a trolley, and means controlled by the trolley for advancing said delivery conveyer relatively to the receiving conveyer during the transverse movement thereof and for retracting said delivery conveyer at the end of each transverse movement thereof.

16. The combination with a leer having a receiving conveyer therein, of a delivering conveyer, means comprising a rotary table for supplying articles to the delivering conveyer adjacent one end thereof, means for driving said delivery conveyer from the rotary table, a delivery means at the other end of said delivering conveyer and driven thereby for transferring articles independently of each other from the delivering conveyer to the receiving conveyer, means including a trolley for moving the delivery end of said delivering conveyer and the delivery means transversely to the receiving conveyer, means for driving the trolley from said rotary table, means for reversing the movement of the trolley, and means whereby the trolley will be retracted at each reversal and advanced during each transverse movement, such retracting and advancing movement of the trolley being imparted to the delivery means.

17. The combination with a leer having a receiving conveyer therein, of a delivering conveyer, means comprising a rotary table for supplying articles to the delivering conveyer adjacent one end thereof, means for driving said delivery conveyer from the rotary table, a delivery table at the other end of said delivering conveyer and driven thereby for transferring articles independently of each other from the delivering conveyer to the receiving conveyer, means including a trolley for moving the delivery end of said delivery conveyer and the delivery means transversely to the receiving conveyer, means for driving the trolley from said rotary table, means for reversing the movement of the trolley, means whereby the trolley will be retracted at each reversal and advanced during each transverse movement, such retracting and advancing movement of the trolley being imparted to the delivery means and delivering conveyer, and means whereby said conveyer will be maintained in proper relation to the table.

18. The combination with a conveyer, of a trolley mechanism for supporting the conveyer which comprises a track, a trolley from which one end of the conveyer is suspended movable transversely on said track, means for imparting motion to the trolley, means for reversing its direction, and means engaged by the trolley for causing said track to oscillate upon each reversal of the movement of the trolley.

19. The combination with a conveyer, of a trolley mechanism for supporting the conveyer for advancing and retracting it and moving it transversely, which comprises a track, supports on which each end of said track is slidable, a trolley movable on said track in either direction, means whereby said track is held with one end in advance of the other to cause said trolley to advance as it moves transversely thereacross, and means operated by the trolley to cause said track to oscillate to advance the other end of the track when the direction of travel of the carriage is reversed.

20. The combination with a conveyer, of a trolley mechanism for supporting the conveyer for advancing and retracting it and moving it transversely, which comprises a track, supports on which each end of said track is slidable, a trolley movable on said track in either direction, means whereby said track is held with one end in advance of the other to cause said trolley to advance as it moves transversely thereacross, and means operated by the trolley to cause said track to oscillate to advance the other end of the track when the trolley has reached its limit of travel in one direction.

21. The combination with a conveyer, of a trolley mechanism for supporting one end of the conveyer for advancing and retracting it and moving it transversely comprising a trolley, a track therefor, means for moving the trolley along the track, means for reversing its direction of movement, means for slidably supporting the ends of said track, means including a series of links whereby said track is held with one end in advance of the other, and means engaged by said trolley to operate the links to oscillate the track to change the positions of the ends of said track when the trolley has reached its limit of travel in one direction, whereby the conveyer will be advanced with the transverse movement of the carriage and retracted at the end of such transverse movement.

22. The combination with a conveyer, of a trolley mechanism for supporting the conveyer for advancing and retracting it and moving it transversely which comprises a track, supports on which the ends of said track are slidably mounted, a trolley movable on the track in either direction, links on said supports and connected with the track for holding one end of the track in advance of the other, means actuated by the trolley to reverse the position of the links to oscillate the track to change the positions of the ends of the track when the direction of travel of the trolley is reversed, said links normally locking the track against oscillation.

23. The combination with a receiving conveyer, of a delivery conveyer having one end thereof movable transversely across the receiving conveyer, an oscillatory bridge diagonally disposed with relation to the receiving conveyer and on which the transversely movable end of the delivery conveyer is supported, means for locking the bridge in a diagonal position, and means for oscillating the bridge to reverse the diagonal position thereof.

24. The combination with a rotary receiving conveyer, of a delivery conveyer, a rotary table adjacent one end of the delivery conveyer for supplying articles thereto, means for driving the rotary table, means whereby the other end of said delivery conveyer may be moved transversely across the leer, means for advancing the delivery conveyer relatively to the receiving conveyer during its transverse movement and means for retracting it at the end of such transverse movement, and means for driving the delivery conveyer from the rotary table while maintaining its speed of travel constant irrespective of the advancing and retracting movement of said delivery conveyer.

25. The combination with a rotary receiving conveyer, of a delivery conveyer, a rotary table adjacent one end of the delivery conveyer for supplying articles thereto, means for driving the rotary table, means whereby the other end of said delivery conveyer may be moved transversely across the leer, means for advancing the delivery conveyer relatively to the receiving conveyer during its transverse movement and means for retracting it at the end of such transverse movement, and means including chain gearing for driving the delivery conveyer from the rotary table while maintaining its speed of travel constant irrespective of the advancing and retracting movement of said delivery conveyer.

26. The combination with a receiving conveyer and a delivery conveyer for supplying articles thereto, of a delivery means for transferring articles from the delivering conveyer to the receiving conveyer comprising stationary inclined members adapted to receive the articles from the delivering conveyer and reciprocable inclined members, said reciprocable members being vertically movable, and means for lifting the reciprocable members, advancing them, lowering them and retracting them to effect a step by step movement of the articles along the stationary inclined members.

27. The combination with a receiving conveyer and a delivering conveyer for supplying articles thereto, of a delivery means for transferring articles from the delivery conveyer to the receiving conveyer comprising a series of spaced apart inclined members adapted to receive articles from the delivering conveyer, reciprocable and vertically movable members between said stationary members, means for raising and lowering said reciprocable members, means for reciprocating said members, said raising and lowering means and said reciprocating means being arranged to raise the reciprocable members when in retracted position, move them forward while so raised, lower them and retract them while lowered whereby a step by step movement of the articles is effected.

28. The combination with a receiving conveyer and a delivering conveyer for supplying articles thereto, of a delivery means for transferring articles from the delivery conveyer to the receiving conveyer comprising a series of spaced apart inclined members adapted to receive articles from the delivering conveyer, reciprocable and vertically movable members between said stationary members, means for raising and lowering said reciprocable members, means for reciprocating said members, said raising and lowering means and said reciprocating means being arranged to raise the reciprocable members when in retracted position, move them forward while so raised, lower them and retract them while lowered whereby a step by step movement of the articles is effected, and means driven by the conveyer for actuating said raising and lowering and reciprocating means whereby the speed of operation of the delivery means is proportionate to the speed of the delivering conveyer.

29. The combination with a leer having a conveyer therein, of means movable longitudinally and transversely of said conveyer for delivering articles thereto and spacing them on the conveyer, said means keeping the articles out of contact with each other and engaging only the bottoms of the articles whereby liability of breakage is reduced.

30. The combination with a leer having a receiving conveyer therein, of means for delivering articles thereto comprising a delivering conveyer, a delivery means at one end of the delivering conveyer, said delivering conveyer and delivery means being adapted to move each article independently of the others, and means for moving the delivering conveyer and delivery means relatively to the receiving conveyer in transverse and longitudinal directions for properly spacing the articles thereon.

31. The combination with a leer having a receiving conveyer therein, of means for delivering articles thereto comprising a delivering conveyer and a supporting frame therefor, a delivery means at one end of the delivering conveyer, said delivering conveyer and delivery means being adapted to move each article independently of the others and engaging only the bottoms of the articles whereby liability of breakage from pressure on the sides of the articles is reduced, and means for moving the delivering conveyer and its supporting frame and delivery means relatively to the receiving conveyer for properly spacing the articles thereon.

In testimony whereof I affix my signature in presence of two witnesses.

WALTER O. AMSLER.

Witnesses:
  LOIS WINEMAN,
  WM. H. PARMELEE.